Nov. 7, 1944.  W. G. GREVE  2,362,264
GROOVE DRILLING MACHINE
Filed April 23, 1941   6 Sheets-Sheet 1
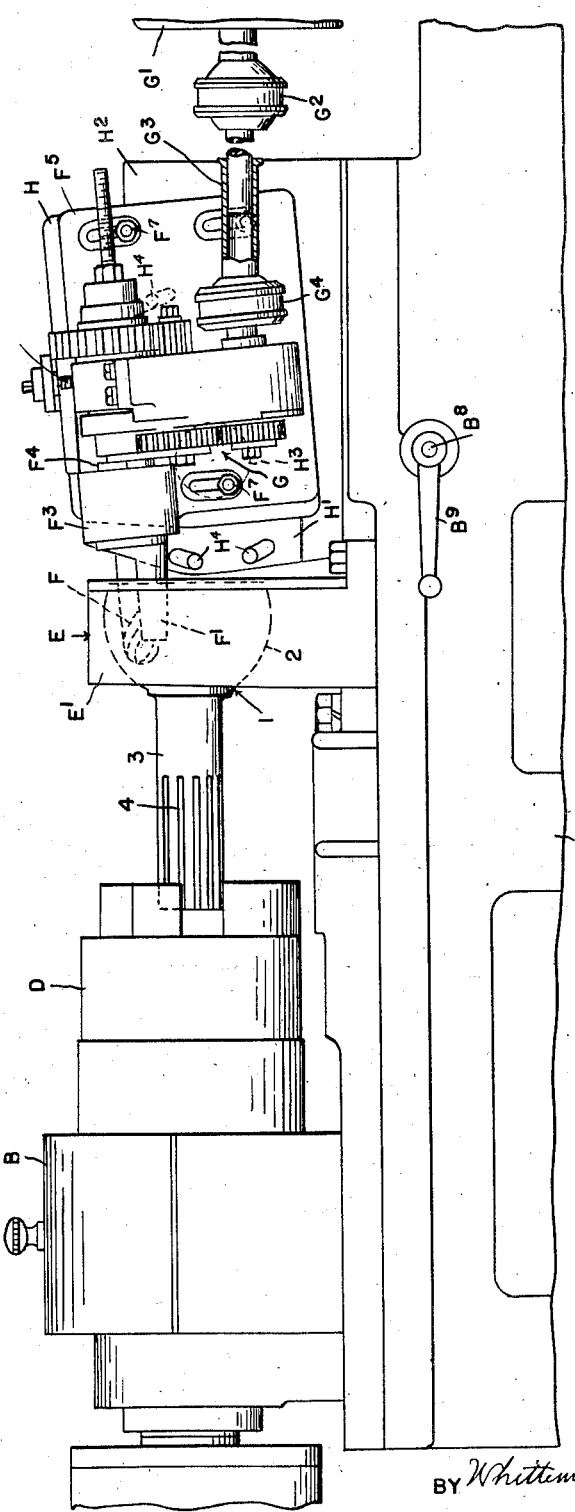
FIG. I.
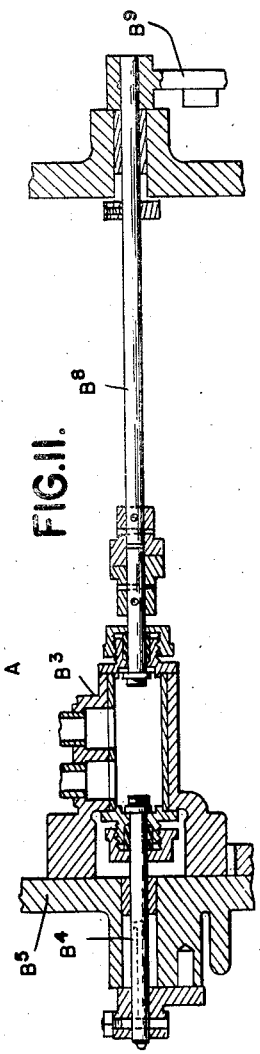
FIG. II.
INVENTOR
WILLIAM G. GREVE
BY *Whittemore Hulbert & Belknap*
ATTORNEYS Nov. 7, 1944.  W. G. GREVE  2,362,264
GROOVE DRILLING MACHINE
Filed April 23, 1941   6 Sheets-Sheet 2

INVENTOR
WILLIAM G. GREVE
BY *Whittemore Hulbert & Belknap*
ATTORNEYS

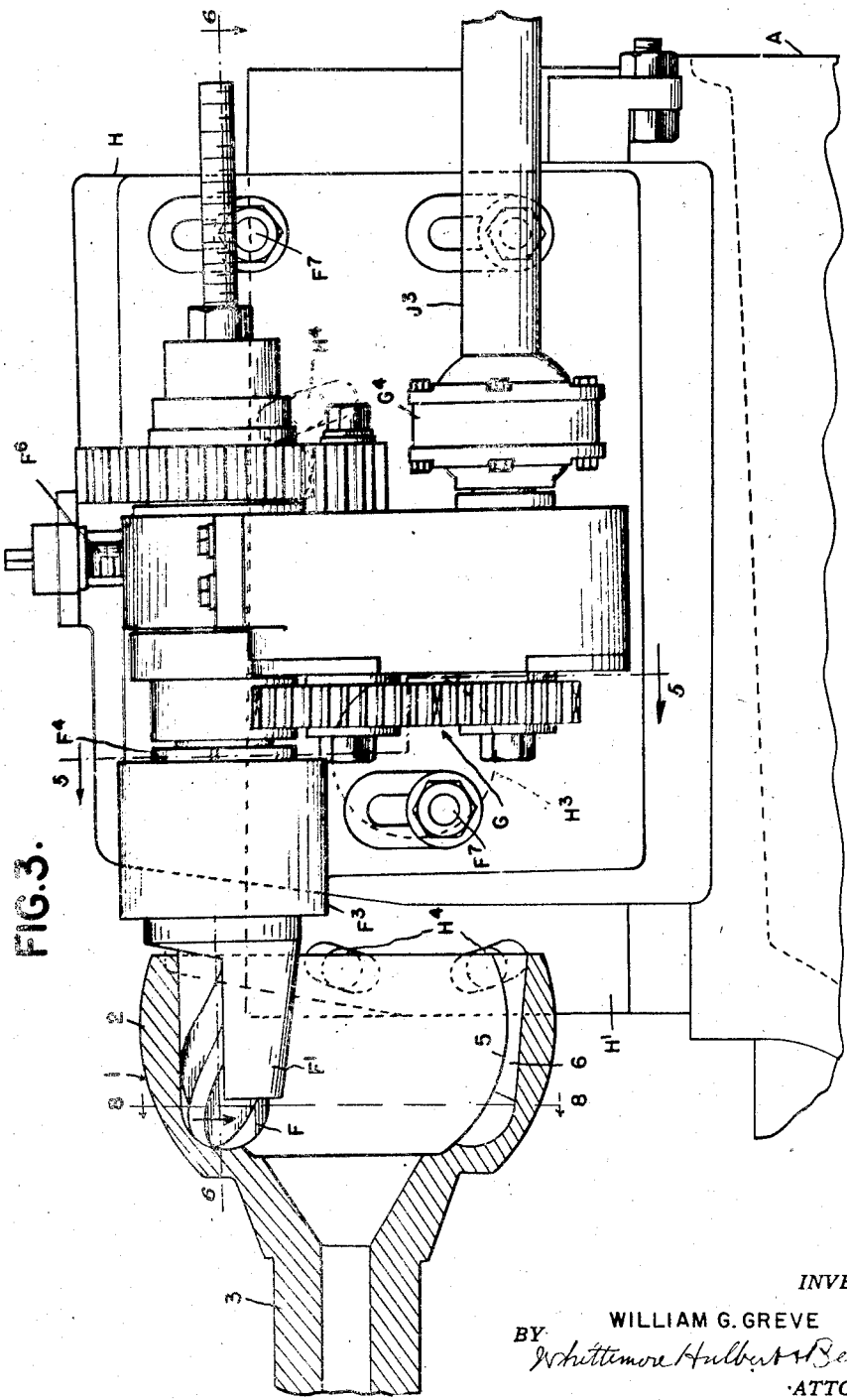

Nov. 7, 1944.  W. G. GREVE  2,362,264
GROOVE DRILLING MACHINE
Filed April 23, 1941  6 Sheets-Sheet 4
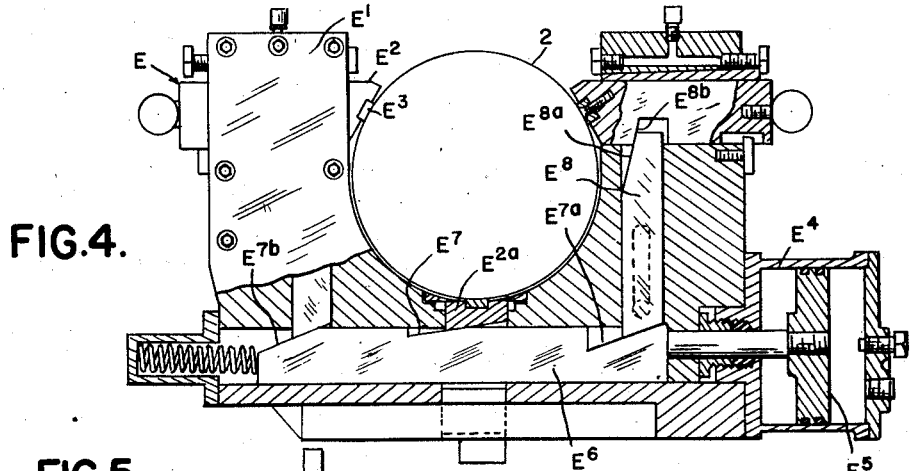
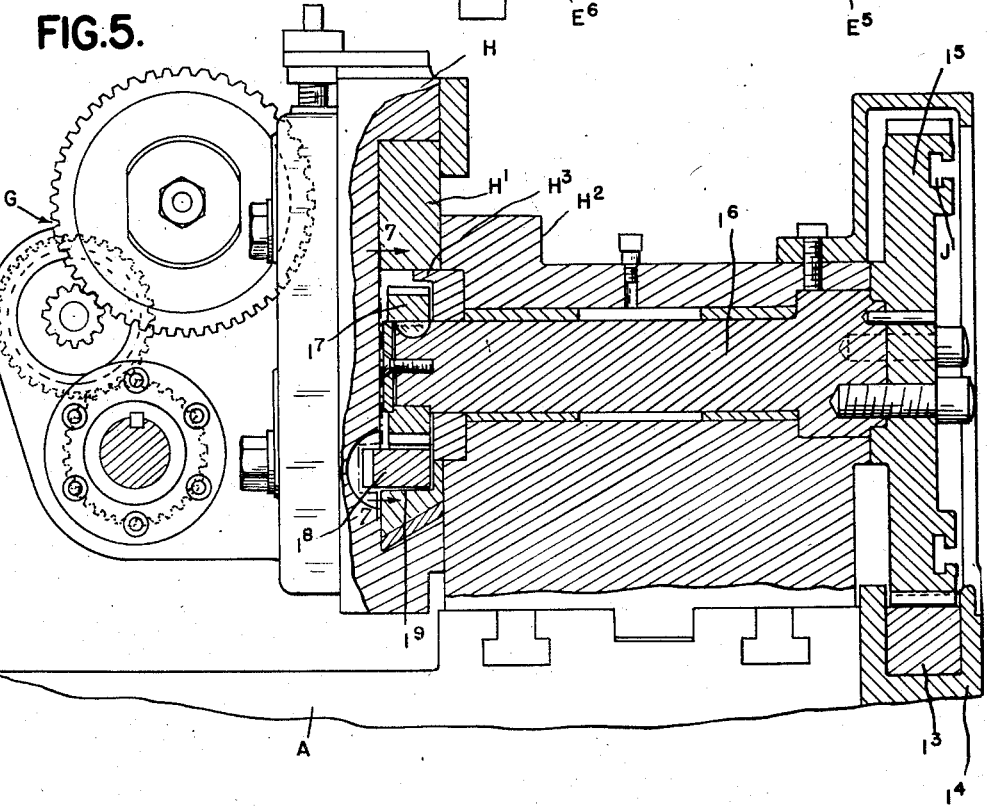
INVENTOR
WILLIAM G. GREVE
BY *Whittemore Hulbert & Belknap*
ATTORNEYS Nov. 7, 1944.  W. G. GREVE  2,362,264
GROOVE DRILLING MACHINE
Filed April 23, 1941   6 Sheets-Sheet 5

INVENTOR
WILLIAM G. GREVE
BY *Whittemore Hulbert & Belknap*
ATTORNEYS

Patented Nov. 7, 1944

2,362,264

UNITED STATES PATENT OFFICE 2,362,264

GROOVE DRILLING MACHINE

William G. Greve, Detroit, Mich., assignor to The Gear Grinding Machine Company, Hamtramck, Mich., a corporation of Michigan Application April 23, 1941, Serial No. 390,002

12 Claims. (Cl. 90—15.1)

The invention relates to machines for internally grooving hollow members and has more particular reference to a machine designed for use in the manufacture of torque transmitting universal joints. One type of universal joint which has been extensively manufactured comprises inner and outer concentric spherical members coupled to each other by balls which are arranged in meridian grooves in the adjacent spherical surfaces of said members. The grooves in the inner or male member are readily machined, but more difficulty is experienced in cutting the internal grooves in the outer or female member due to the restricted clearance for the cutting tool.

It is the object of the instant invention to obtain a mechanism which efficiently performs one step in the operation of internally grooving the female members of universal joints, and to this end the invention consists in the construction as hereinafter set forth.

In the drawings:

Fig. 1 is an elevation of one side of the machine;

Fig. 3 is an enlarged view of a portion of Fig. 1 illustrating the operation of the machine on the work;

Fig. 4 is a cross section through the steady rest;

Fig. 5 is a cross section, partly in elevation, substantially on line 5—5 of Fig. 3;

Fig. 11 is a cross section showing the operating mechanism for the valve controlling the indexing mechanism.

Member to be grooved

Figure 10:
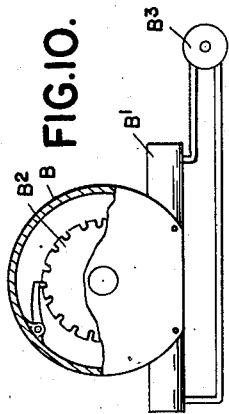
Fig. 10 is a diagrammatic view illustrating the indexing mechanism.
Figure 2:
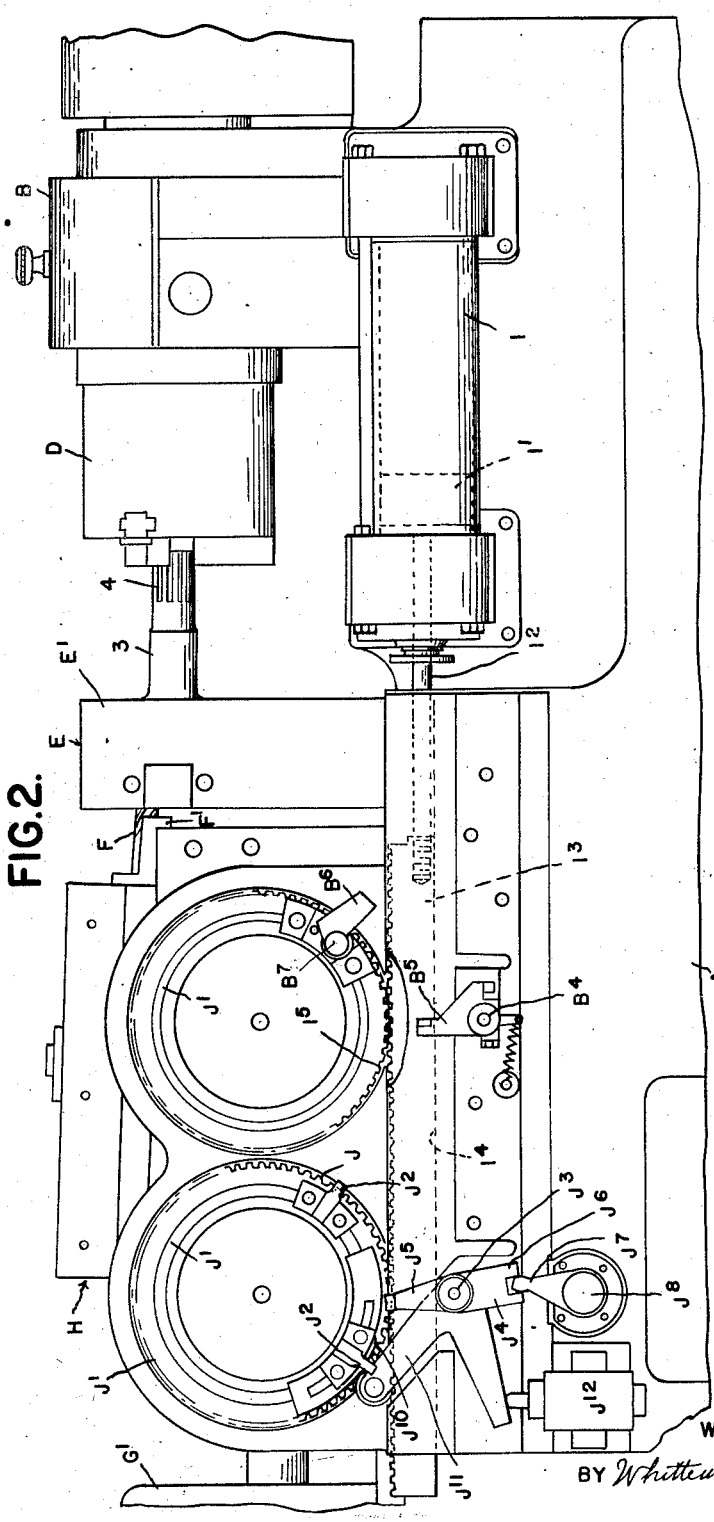
Fig. 2 is an elevation of the opposite side of the machine.
Figure 9:
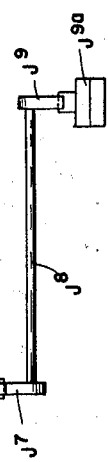
Fig. 9 is a diagrammatic cross section showing the operating mechanism for the reversing valve of the reciprocating mechanism.
Figure 6:
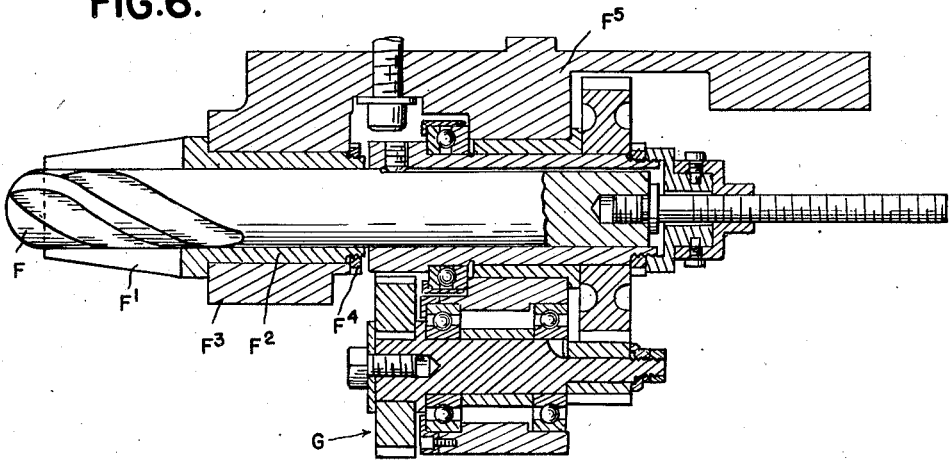
Fig. 6 is a horizontal section on line 6—6 of Fig. 3.
Figure 7:
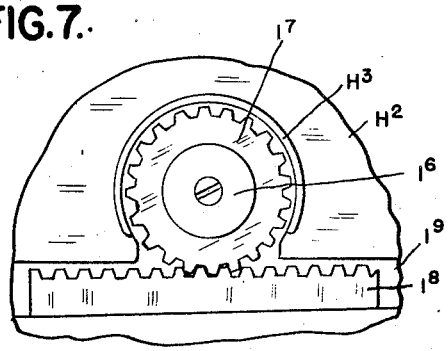
Fig. 7 is a section on line 7—7 of Fig. 5.
Figure 8:
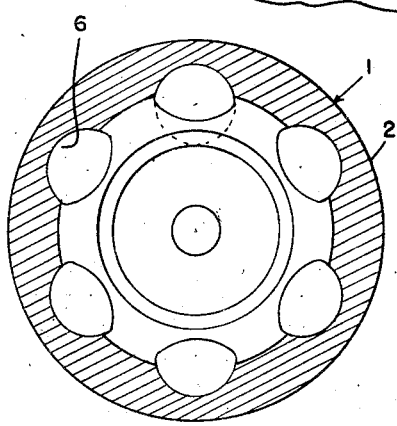
Fig. 8 is a section on line 8—8 of Fig. 3.

While my improved machine may have other uses than in the manufacture of universal joints, I shall describe a construction specifically adapted for this one use. As illustrated in Figs. 1 and 3, the universal joint member 1 has a hollow spherical portion 2 and a shank portion 3, which latter may be formed with splines 4 for coupling with the drive or driven member (not shown). The portion 2 has a spherical inner surface 5 and a plurality of grooves 6 extending in axial planes and longitudinally curved to be concentric with the surface 5. As shown in Fig. 8, there are six of the grooves 6, which are spaced from each other by an angle of 60°. It is essential that the indexing of these grooves should be exact, in order that they may accurately register with the corresponding grooves on the male member. It is also essential that they should be concentric with the axis of the shank 4.

The blank for the member 1 is preferably formed as a steel forging or casting, and the grooving operations are performed subsequent to the machining of the shank 3 and the forming of the splines 4 thereon. This shank therefore forms a means for holding the member 1 during the grooving operations and for engaging the same with the indexing mechanism. The first step in the operation of forming the arcuate grooves is to drill straight grooves or channels in properly indexed relation to each other, and this is the operation performed by the machine forming the subject matter of the instant application.

General description of machine

Briefly described, my improved machine comprises a drill mounted in an axial plane of the work, said mounting being adjustable to vary both the radial length from and the angle to said axis. The machine is further provided with a reciprocatory carriage for advancing and retracting the drill, together with controlling means therefor, through which the length of travel may be varied. A further feature is the automatic control for the indexing mechanism by which, during a portion of the reciprocatory movement while the drill is withdrawn from the work, the latter will be indexed to a new position for a succeeding drilling operation. Still another feature is a steady rest support for the portion of the work which is engaged by the drill and which is automatically clamped prior to the drilling operation and released prior to the indexing operation.

Work support and indexing mechanism

Mounted on a suitable bed or frame A is a housing B having arranged therein an indexing mechanism connected with a rotary spindle, which latter is provided with a work holding chuck D adapted to engage the shank 3 of the member I. The specific construction of indexing mechanism is not a part of the instant invention, and it will be sufficient to state generally that it includes a hydraulic actuating mechanism, a notched indexing disc, and locking means therefor. The work is further supported during the drilling operations, by a steady rest E, which is in the plane of the enlarged spherical portion 2 of the work and is of the following construction:

Steady rest

E' is a U-shaped frame mounted on the bed and extending upward therefrom to embrace the portion 2. $E^2$ are jaw members slidably mounted in bearings in the frame E' and provided with work engaging pads $E^3$ which are spaced from each other about the axis of the work by angles of substantially 120°. These jaws are simultaneously operated to clamp or unclamp the work, by hydraulic pressure operating in a cylinder $E^4$ against a piston $E^5$ which actuates a sliding bar $E^6$. This bar has a cam portion $E^7$ for directly actuating one of the jaw members $E^{2a}$ and cam portions $E^{7a}$ and $E^{7b}$ for actuating transversely slidable bars $E^8$. The latter have cam portions $E^{8a}$ for engaging inclines $E^{8b}$ on the jaw members $E^2$ to actuate the same in a substantially radially inward direction. It will thus be understood that whenever fluid pressure is exerted against the piston $E^5$, all three jaws will be simultaneously actuated in an inward direction to firmly clamp the portion 2 of the member I, and when fluid pressure on the piston is released, pressure of the jaws is relieved so as to permit the indexing operation.

Drilling mechanism

The tool for forming the grooves is preferably a twist drill F, having a rounded nose portion and of a diameter slightly greater than the width of the groove. The axis of the drill when in operation is not parallel to the axis of the member I, but inclines slightly toward said axis from the outer to the inner end of the groove. Also, the axis of the drill lies inside of the inner face of the member 2, so that the cross section of the groove is less than one-half the cross section of the drill. Consequently, during the drilling operation, the drill must be reinforced to take care of the radial inward thust, which is accomplished by a semi-circular reinforcing member F'. This has a tubular shank $F^2$ which engages a supporting bearing $F^3$ to which it is clamped by a nut $F^4$. The bearing $F^3$ is preferably integral with a plate $F^5$ which also supports a stepdown change gear transmission G. for driving the drill. The plate $F^5$ is vertically adjustably secured to a carriage H by means of an adjusting screw $F^6$ and clamping bolts $F^7$. The carriage H is longitudinally slidable upon a guideway member H'. The member H' is angularly adjustably secured to a frame member $H^2$ mounted upon the bed A, said angular adjustment permitting the setting of the axis of the drill in the desired relation to the axis of the work. As shown, the member H' has a circular recess therein engaging a projecting hollow pivot member $H^3$ on the member $H^2$, and clamping bolts $H^4$, passing through slots in the member $H^2$ and engaging the member H', hold the latter in its angularly adjusted position about the pivot $H^3$.

Reciprocating mechanism

For actuating the carriage H to impart a reciprocatory movement thereto, there is mounted on one side of the bed a cylinder I containing a piston I', which is connected by the rod $I^2$ to a rack bar $I^3$ slidably mounted in a guideway $I^4$ at the side of the bed. This rack bar is in mesh with a gear wheel $I^5$ mounted on a shaft $I^6$, which is journaled in the member $H^2$ and extends across the bed and through the hollow pivot $H^3$ in concentric relation thereto. A pinion $I^7$ is mounted on the shaft $I^6$ within the circular recess in the member H', and this pinion is in mesh with the rack bar $I^8$ which is longitudinally movable in a channel $I^9$ in said member H' and is secured to the member H to actuate the same. Thus, a reciprocatory movement of the piston I' within the cylinder I will transmit this movement through the elements just described to the carriage H which, in turn, reciprocates the drill F.

Controlling means for reciprocating mechanism

Rotatably mounted on the frame $H^2$ adjacent to the gear wheel $I^5$ is a second gear wheel J which also is in mesh with the rack $I^3$. The outer face of the gear wheel J has formed therein an annular undercut or T-shaped slot J', and a plurality of dogs $J^2$ are adjustably mounted in this slot to project outward from said face of the gear. Projecting outward from the side of the bed A beneath the gear wheel J and rack bar $I^3$ is a pin $J^3$ on which is pivotally mounted a rocker member $J^4$. One arm $J^5$ of this rocker member projects into the path of the dogs $J^2$, while another arm $J^6$ engages a rocker member $J^7$ on a shaft $J^8$. The opposite end of this shaft has a rocker arm $J^9$ which actuates a reversing valve $J^{9a}$ controlling the supply of hydraulic fluid alternately to opposite ends of the cylinder I to actuate the piston I' therein. The length of stroke of the piston is therefore controlled by the setting of the dogs $J^2$, and this forms a means of controlling the length of reciprocatory movement of the drill F. In addition to the dogs $J^2$, a cam member $J^{10}$ is adjustably secured to the gear wheel J, and this cam member cooperates with a second rocker member $J^{11}$ mounted on the pivot pin $J^3$. The rocker $J^{11}$, when moved by the cam $J^{10}$, operates a valve $J^{12}$ which is in the supply line for hydraulic fluid to the reversing valve $J^{9a}$ and restricts the flow so as to slow the movement of the piston I'. The purpose of this is to slow the movement of the mechanism operated by the piston I' while the drill is performing its work in the cutting of the groove, and after this work is completed, the movement of the mechanism is accelerated during the remainder of the cycle.

Drilling rotating mechanism

As above described, the drill F is connected to a transmission gearing G mounted upon the plate $F^5$, which plate is secured to and movable with the carriage H. The driving mechanism for this gearing G comprises a motor G' mounted on the bed, which is connected through the medium of a universal joint $G^2$ to a telescopic shaft $G^3$, the latter being connected by a universal joint $G^4$ with the driving gear of the transmission G. Thus, the telescopic shaft $G^3$ and universal joints $G^2$ and $G^4$ transmit rotary movement to the gearing G without interfering with the reciprocatory movement of the carriage. The desired speed of rotation for the drill E may be obtained by changing gears in the transmission G.

Indexing mechanism

Figure 12:
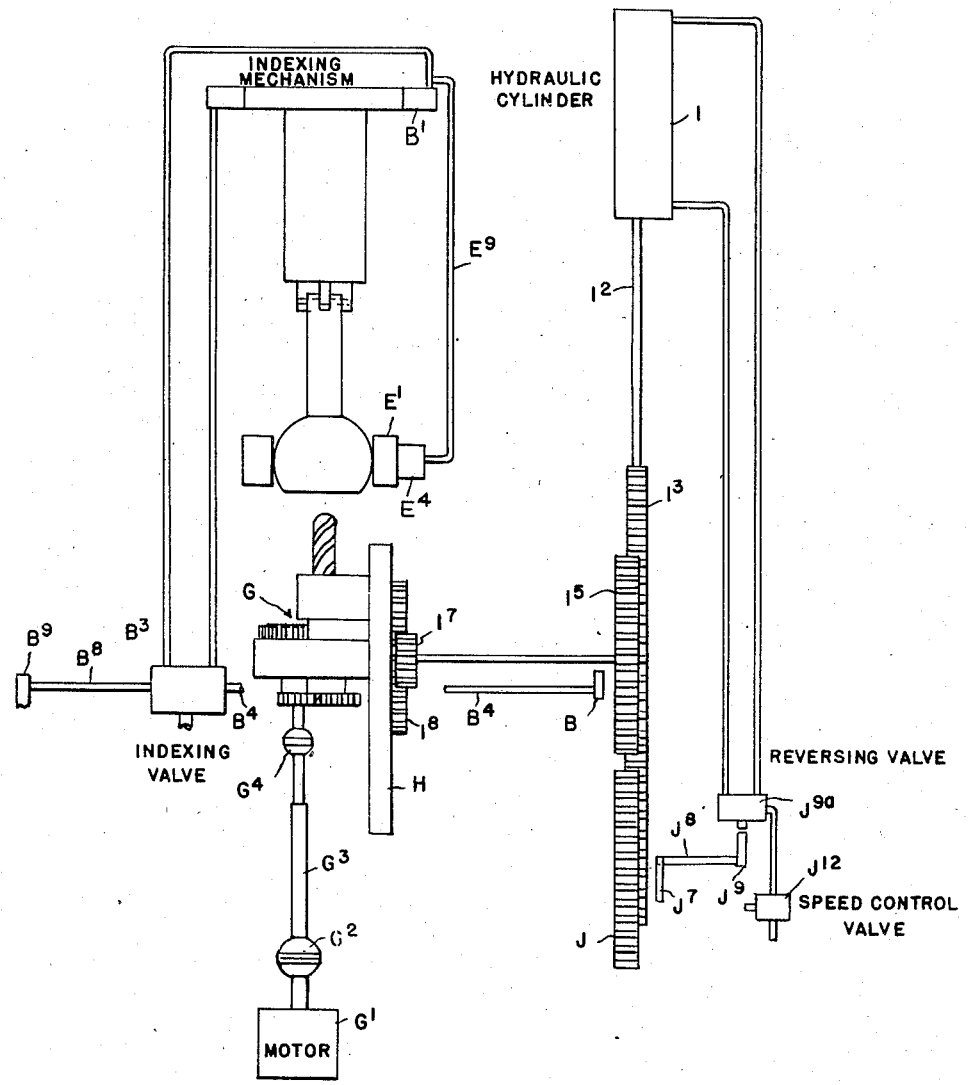
Fig. 12 is a diagrammatic plan view illustrating the control means for the various parts of the machine.

As previously described, the indexing mechanism arranged within the housing B includes a hydraulic actuating motor B' and a notched indexing disc B². The operation of the hydraulic motor is controlled by a valve B³ which is operated by a rock shaft B⁴. On this rock shaft and at the side of the bed A is an upwardly extending rock arm B⁵ which is in the path of a dog B⁶ adjustably mounted on the gear wheel I⁵. This adjustable mounting is similar to that previously described in connection with the gear wheel J and permits the setting of the dog so that it will actuate the rock arm B⁵ after the drill F is completely withdrawn from the work. This will permit operation of the hydraulic motor B' to effect an indexing operation which will be completed before the drill F again comes in contact with the work. The completion of the indexing cycle is automatic, and it is therefore unnecessary that the dog B⁶ should actuate the rock arm B⁵ during the return movement of the gear wheel I⁵. Thus, the dog is provided with a pivotal mounting B⁷, permitting it to latch over the arm B⁵ during such return movement. The operation of the shaft B⁴ also controls, by suitable means (not shown), the supply of fluid pressure to the cylinder E⁴ of the steady rest, so that the work will be clamped prior to the operation of the drill and will be released prior to the operation of the indexing mechanism. As shown in Fig. 12, a conduit E⁹ connects the cylinder E⁴ with one fluid conduit to the motor B' so as to clamp the work in the steady rest during the return movement of the indexing mechanism and to release the clamp during the indexing movement. The valve B³ may be manually operated, when desired, by a shaft B⁸ and rock arm B⁹.

*Operation*

After the work, such as the member 1, is mounted by engaging the shank 3 thereof with the chuck D, the plate F⁵ is vertically adjusted on the carriage H, in accordance with the radial distance between the axis of this member 1 and the axes of the grooves to be cut therein. Also, the guideway member H' is angularly adjusted to be suitable for the particular work to be performed. The dogs J² are then adjusted on the gear wheel J so as to give the proper length of stroke to the piston I', and the cam J¹⁰ is properly set to slow the speed of movement during the portion of the cycle in which the drill is cutting the groove. The dog B⁶ is also properly set on the gear wheel I⁵ so that the indexing mechanism will be operated during the portion of the reciprocating movement of the carriage when the drill is out of contact with the work.

After these adjustments have been made, the machine is started and will successively drill grooves in the portion 2 of the member 1, indexing of said member being automatically performed intermediate successive drilling operations. As the drill is only cutting on one side of its axis, the reinforcing member F' is essential to hold it to its work. Also, it is necessary to rigidly hold the work from lateral displacement, which is accomplished by the hydraulic steady rest E.

What I claim as my invention is:

1. In a grooving machine, the combination with a drill, of means for holding the work in the path of a segment only of said drill, and means for resisting deflection of said drill under lateral thrust of the work.

2. In a grooving machine, the combination with a drill, of a holder for the work adapted to position the same in the path of a segment only of said drill, and a thrust bearing for a segment of said drill diametrically opposed to the aforesaid segment.

3. In a grooving machine, the combination with a drill, of a work holder adapted to position the work in the path of a segment only of said drill, and a reinforcing sleeve surrounding a portion of said drill and provided with a projecting portion engaging a segment of said drill diametrically opposed to the aforesaid segment and constituting a lateral thrust bearing.

4. In a machine for internally grooving annular members, the combination with a drill, of a work holder rotatably adjustable to position successive portions of said annular member in the path of a segment only of said drill, the remaining portion of said drill being movable within said annular member, and a thrust bearing for the latter portion of the drill opposed to the aforesaid segment.

5. In a grooving machine, the combination with a bed, of a work holder mounted on said bed, a head also mounted on said bed to extend above the same and provided with a hollow pivot extending laterally therefrom, a guideway mounted on said hollow pivot to be angularly adjustable thereon and provided with means for clamping to said head in different positions of adjustment a carriage slidable on said guideway, a drill mounted on said carriage, and means for reciprocating said carriage comprising a shaft passing through said hollow pivot, a pinion on said shaft, a rack engaging said pinion passing through a cutaway portion of said hollow pivot and secured to said carriage, and means for rotating said shaft alternately in opposite directions.

6. In a grooving machine, the combination with a bed, of a work holder mounted on said bed, a head also mounted on said bed to extend above the same and provided with a hollow pivot extending laterally therefrom, a guideway mounted on said hollow pivot to be angularly adjustable thereon and provided with means for clamping to said head in different positions of adjustment a carriage slidable on said guideway, a drill mounted on said carriage, and means for reciprocating said carriage comprising a shaft passing through said hollow pivot, a pinion on said shaft, a rack engaging said pinion passing through a cutaway portion of said hollow pivot and secured to said carriage, a gear wheel secured to the opposite end of said shaft, a rack engaging said gear wheel, and means mounted on said bed for reciprocating said rack.

7. In a grooving machine, the combination with a bed, of a work holder mounted on said bed, a head also mounted on said bed to extend above the same and provided with a hollow pivot extending laterally therefrom, a guideway mounted on said hollow pivot to be angularly adjustable thereon and provided with means for clamping to said head in different positions of adjustment a carriage slidable on said guideway, a drill mounted on said carriage, and means for reciprocating said carriage comprising a shaft passing through said hollow pivot, a pinion on said shaft, a rack engaging said pinion passing through a cutaway portion of said hollow pivot and secured to said carriage, a gear wheel secured to the opposite end of said shaft, a rack engaging said gear wheel, a hydraulic cylinder mounted on said bed, a piston in said cylinder connected to said rack, a reversing valve for the hydraulic fluid controlling the reciprocation of said piston, and adjustable means for operating said reversing valve to control the length of stroke of of said piston and carriage.

8. In a grooving machine, the combination with a supporting bed, of a work holder mounted thereon, a guideway also mounted on said bed to extend above the same and angularly adjustable with respect to the axis of said work holder, a carriage on said guideway, a drill mounted on said carriage to extend in an axial plane of said work holder and adjustable toward or from said axis, means for reciprocating said carriage, a motor for driving said drill, a change speed transmission mounted on said carriage, and a universally jointed telescopic driving connection between said motor and said change speed transmission.

9. In a grooving machine, the combination with a bed, of a rotary work holder mounted thereon, an indexing mechanism for said rotary work holder, a carriage mounted for reciprocation on said bed, a drill mounted on said carriage in operative relation to the work in said work holder, a steady rest for clamping and rigidly supporting the portion of the work engaged by said drill, means for reciprocating said carriage, means automatically actuating during the portion of the reciprocation when said drill is disengaged from the work for operating said indexing mechanism, and automatically operating means for releasing said steady rest in advance of the operation of said indexing mechanism and for reclamping the same in advance of engagement of said drill with the work.

10. In a grooving machine, the combination with a bed, of a work holder mounted thereon, a head mounted on said bed to project upward therefrom, a hollow pivot projecting from said head, a guideway mounted on said hollow pivot and angularly adjustable thereon, means for clamping said guideway to said head in different positions of adjustment, a carriage slidable on said head, a drill mounted on said carriage in operative relation to the work in said holder, and means for reciprocating said carriage and controlling the length of stroke thereof, comprising a pinion within said hollow pivot, a rack engaging said pinion extending through a cutaway portion of said hollow pivot and secured to said carriage, a shaft for said pinion extending through said head, a gear wheel mounted on the opposite end of said shaft, a rack engaging said gear wheel, a hydraulic cylinder mounted on said bed, a piston in said cylinder connected to said rack, a reversing valve for the hydraulic fluid controlling the reciprocation of said piston in said cylinder, a second gear wheel in mesh with the rack engaging said first gear wheel, and adjustable dogs on said second gear wheel for actuating said reversing valve and determining the length of stroke of said piston.

11. In a machine for internally grooving universal joint members having a shank portion and an enlarged hollow head portion, the combination with a bed, of a rotary chuck mounted thereon for engaging the shank of the work, an indexing mechanism for rotatively advancing said chuck, a carriage mounted for reciprocation on said bed, a drill mounted on said carriage in operative relation to said hollow head portion, a steady rest for externally engaging and clamping said hollow head portion concentric with the axis of said shank portion, means for reciprocating said carriage, means automatically actuating during the portion of the reciprocation of said carriage when said drill is disengaged from the work for operating said indexing mechanism, and automatically operating means for releasing the clamp of said steady rest in advance of the operation of said indexing mechanism and for reclamping the same in advance of engagement of said drill with the work.

12. In a grooving machine, the combination with a supporting bed, of a rotary work holder revoluble about the axis of the work therein mounted on said bed, an indexing mechanism for said rotary work holder, a head mounted on said bed having a face extending in a plane parallel to said axis of the work, a guideway mounted on said face and angularly adjustable thereon in the plane thereof with respect to said axis, a carriage travelingly mounted on said guideway, a drill mounted on said carriage to extend in the plane of said axis and adjustable towards or from said axis, means for reciprocating said carriage, a motor for rotating said drill, and a change-speed gearing between said motor and drill for adjusting the angular velocity of the latter.

WILLIAM G. GREVE.